Oct. 13, 1953    J. J. BRODESKE    2,655,276
DUMP CAR FOR INCLINED TRACKS
Filed Aug. 23, 1949
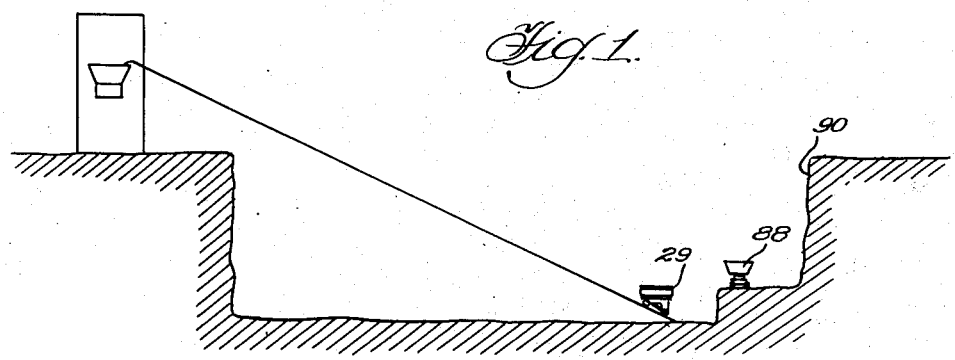
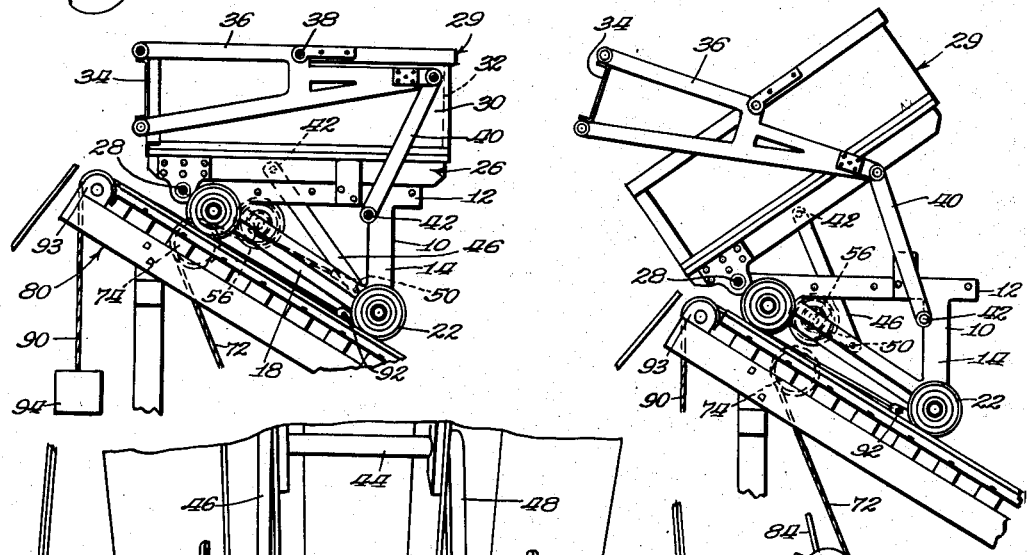
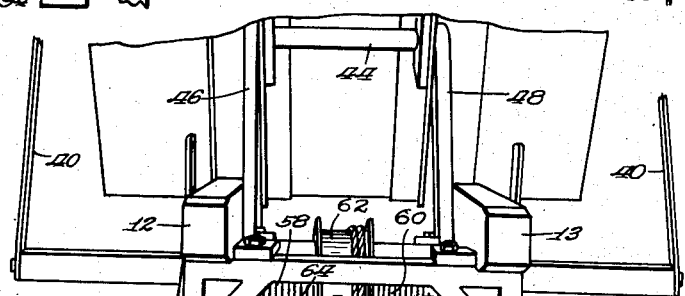
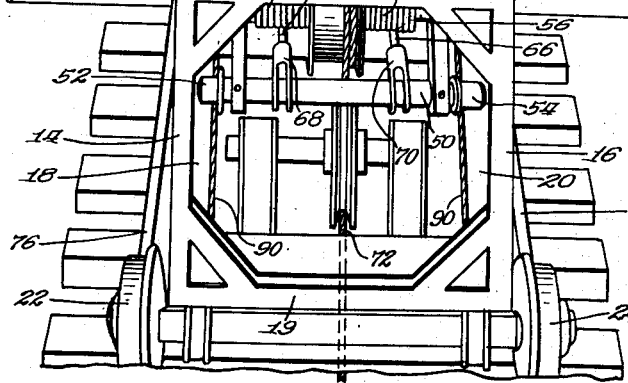
INVENTOR.
John J. Brodeske
BY
Atty.

Patented Oct. 13, 1953

2,655,276

UNITED STATES PATENT OFFICE 2,655,276

DUMP CAR FOR INCLINED TRACKS

John J. Brodeske, Joliet, Ill.

Application August 23, 1949, Serial No. 111,789

15 Claims. (Cl. 214—103)

This invention relates to a dump car and the combination of a dump car with an inclined track and hopper. The invention relates more particularly to such equipment for stone quarries.

This invention has one principal object but it is to be attained by meeting two conditions. Applicant's object is to provide a dump car hoist arrangement wherein the clutch controlling the cable hoist need be opened only once during the entire car raising and dumping operation. The two conditions are, firstly, that the dump car be coupled to a counterweight, and secondly, that the dump car empty over the track side of the hopper. The relationship of the object and the conditions to each other may best be appreciated by briefly describing existing quarry equipment in the Middle West.

At the present time, there are two general types of dump car and inclined track equipment used in below-grade stone quarries. In one type, the track is level on the quarry floor. It then turns upwardly at whatever incline is required until it reaches the near edge of the crusher hopper well above the ground level, whereupon it again turns substantially horizontal directly over the hopper and then turns sharply upward. The car has a horizontal bed when the wheels are on the horizontal portion of the track, and a raisable gate constitutes the rear wall of the car. This gate is opened after the car has been pulled across the top of the crusher hopper onto the sharp incline with the result that the hopper discharges its load between the rails into the hopper. The top of the hopper may vary in area from 100 to 300 square feet, and substantial structure is necessary to carry the track over the top of the hopper. In this arrangement, a counterbalance for the weight of the car is not useful for if the counterbalance is adjusted to handle the car on the main incline, it is unsatisfactory when the car is on the level portions of the track. A counterbalance, therefore, is not employed and the hoist cable must raise not only the weight of the stone in the car but also the car.

The first disadvantage of this arrangement lies in the fact that cars are made light in order to reduce the load on the hoist cable. The cars are so light that they cannot withstand for long the abuse from dropped virgin stone. Stone comes from the quarries in sizes up to twelve to eighteen inches thick and three to six feet in one or both of the other dimensions. The stone is deposited by a power shovel on either a dump car operating on a track in the bottom of the quarry or sometimes on automobile trucks. The stone is dumped by gravity from the truck onto the dump car. A heavy block of stone can bend a wall or render inoperable an end gate. This difficulty is so common that in many of the quarries in the Middle West, the first crusher has been moved from ground level down to the quarry floor where the initial breaking up of the stone into sizes not to exceed six to eight inches in any one dimension is performed. Where this has been done, the dump car arrangement heretofore described receives the output of the first crusher and carries it on up to ground level into a hopper feeding further crushers. Because the stones are now comparatively small, the dump car can be made of light materials and still have a comparatively long life. However, the installation is costly, and additionally undesirable because it requires power down in the quarry floor.

A second objection to this first system arises from the damage done to the track over the hopper. In the existing system heretofore described, large stones dropped by the dump car have bent and broken the track. Quite commonly, the car is unable to renegotiate the track across the hopper and there have been times when a section of rail has broken and dropped into the crusher.

A third objection to this system lies in the fact that the hoist operator must vary the speed of the cable frequently during the operation. Not much difficulty is encountered in bringing the car from the quarry floor to the near edge of the hopper, the cable dropping into sheaves lying between the rails. As the car moves into horizontal position over the hopper, much less power is required and then, for a short moment as the car is brought onto the very sharp inclined track beyond the hopper's edge, a maximum amount of power is required followed by a complete stop and application of a brake to the winch. Due to no fault of the operator, the wheels of the car may be jerked off the track, or the car may start its return movement before it is completely empty, or a big block of virgin stone may lodge on the track and before the operator realizes what has happened, he has backed the car onto it and derailed the car.

The second system in use in many midwest quarries employs a track lying in a single inclined plane extending from a point below the quarry floor to the near edge of the first crusher hopper fifty to one hundred feet above ground level, in conjunction with a kangaroo dump car, which is one in which the floor of the car is level as the car moves up an inclined plane. At the very edge of the hopper, however, the track does incline first to the horizontal, and then to the other direction over the hopper, so that as the kangaroo dump car moves over this curved portion of the track, it automatically dumps itself into the hopper. This system has two serious objections. Firstly, if the dump car moves over the center of the curved portion of the track adjacent the hopper edge, it stays there, and this is true whether there is a counterweight attached to it or not. It is up to the operator to stop just short of the critical point. Here again, the operator must exercise judgment and skill.

There are many variations of the two fundamental systems described, some using counterweights, and some using two cars and two tracks, one counterweighted against the other, but none of them attains the principal object, namely, to engage the hoisting clutch of the draw-up cable attached to the car and have that cable, without touching the clutch, bring the car to the hopper and emtpy it over the near edge of the hopper without any manipulation by the operator. A feature of applicant's invention is the employment of a kangaroo car on a straight inclined track and substantially balanced by a counterweight. This car has a body which may be tilted forward and the means for tilting the body forward is the very cable that pulls the car up the inclined track. The cable is rendered ineffective to dump the car until the car attains a selected relationship to a sheave at the top of the track and over which the cable is operated. When the car reaches this relationship, upward movement of the car ceases and the dumping apparatus on the car commences to function. There are no stops on the track and there is no possibility of the car's being stuck either loaded or unloaded. The moment the power on the cable is released, the dump body first resumes its horizontal position and then starts back down the track, and this is true whether the body has partly emptied itself or has fully emptied itself.

These and such other objects as may hereinafter appear are attained in the embodiment of the invention shown in the accompanying drawings, wherein:

Fig. 1 is a schematic illustration of a quarry dump car track and stone crusher;

Fig. 2 is a side elevation of the car immediately before emptying;

Fig. 3 is a side elevation of the car while emptying; and,

Fig. 4 is a face view of the car with the body in raised position as viewed from the right in Fig. 3.

Continuing to refer to the drawings, applicant's car consists of a chassis 10 having horizontal beams 12 and 13 supported by vertical uprights 14 and 16 joined at the lower portions by members 18, 19 and 20. Four wheels such as 22 and 24 are appropriately supported by the chassis. As thus far described, this constitutes a kangaroo dump car chassis.

The body 29 of the car has a bed 26 pivotally supported at 28 to the chassis 10. Rigidly fastened to the front and sides of the floor 26 are side walls such as 30 and a back wall such as 32. The rear or dumping side of the truck is closed by a movable gate 34 comprising a plate fastened at each side to a bell crank lever such as 36 which is centrally pivoted at 38 to one of the side walls of the body. The other end of each lever 36 has pivotally mounted to it a link 40 which is pivotally fastened at 42 to the chassis 10.

It is evident that by raising the body 29 around the pivot 28, as illustrated in Fig. 3, the links such as 40 will pivot the bell crank levers such as 37 around the pivot points 38 and raise the gate 34 above the rear end of the body 29.

Disposed horizontally beneath the floor 26 of the body 29 is a shaft 44 which carries pivotally at either end two arms 46 and 48. The lower ends of these arms are rigidly fastened to a shaft 50, referring to Fig. 4, which shaft carries at either end roller bearing wheels or rollers 52 and 54. The heretofore described members 18 and 20 are angle irons, which face each other so that the rollers 52 and 54 rest on these angle irons and the upwardly directed flanges thereof hold the shaft 50 and the rollers 52 and 54 against substantial lateral displacement. Movement of the shaft 50 to the left from the position shown in Fig. 2 to the position shown in Fig. 3 will raise the dump car body 29 and open the end gate 34.

Rotatably mounted on the members 18 and 20 is shaft 56. This shaft 56 carries what may be called a reduction drum, and comprises two small drums 58 and 60 and one large drum 62. These drums are all keyed to the shaft. Cables 64 and 66 each have one end fastened to drums 58 and 60 respectively and the other end fastened to cable sockets 68 and 70 which in turn are mounted on the shaft 50. The ratio of the large drum 62 to the small drums 58 and 60 is one to three.

One end of a hoisting cable 72 is fastened to the large drum 62 and carried over a sheave 74 mounted between the rails 76 and 78 of a track 80 inclined at 44 degrees to the horizontal. This sheave, referring to Fig. 3, is carried down to a winch 82, schematically illustrated, which is engaged through a clutch, not shown, to a source of power by a handle 84, and which is subject to the action of a brake 86. A cable 90 is fastened by one end to the chassis 10 at 92 and carried over a sheave 93 to support a counterweight 94, which is slightly lighter than the car when empty.

The operation of the car is as follows. Referring to Fig. 1, the body 29 is loaded with virgin stone from a line of railroad dump cars such as 88 in the bottom of the quarry 90. This car will hold 20 tons of stone and is made of very heavy steel plates so that it will not be damaged by blows from one- and two-ton pieces of stone falling from the car 88 to the body 29. When the body 29 has its load, the operator engages the clutch by the handle 84 and the winch 82 commences to reel in the cable 72. The car moves up the grade under power just sufficient to carry the load, until the car reaches the position illustrated in Fig. 3. At this point, the shaft 56 is to the left of a line centrally of the axis of the sheave 74 and erected at right angles to the plane of the track. The car stops moving up the incline, but since the operator has not touched the clutch, the cable 72 continues to be drawn onto the winch. This rotates the large drum 62 which in turn causes the smaller drums 58 and 60 to reel in the cables 64 and 66 thereby raising the body 29 as illustrated in Fig. 3.

At the approximate moment when the body 29 has reached its maximum inclination, the operator opens the clutch by the handle 84 and applies the brake 86. The only skill required in the entire operation is this action. As soon as the body has emptied itself, the operator releases the brake. The winch 82 is controlled by a governor so that it will not pay out cable faster than a desired rate of speed. When the brake 86 is released, the car does not move from the position in Fig. 3 until the body 29 has dropped into the position illustrated in Fig. 2. When it has reached this position, the car then moves down the grade, the operator not touching the controls in any way.

It is, of course, evident that the ratio between the large drum 62 and the small drums 58 and 60 is important. The ratio is this: The leverage which the large drum must have on the small drum must be just insufficient to raise the weight of the body 29 when empty on a selected incline. It follows from this that if the angle of the incline is decreased, the drum ratio is increased; and if the angle of the incline is increased, the drum ratio is decreased. The inclinations of the track in quarries are not all the same. In consequence, the ratio of the drums must be worked out for each particular quarry inclined track which is to be equipped with applicant's dump car.

Having thus disclosed applicant's invention, what he claims is:

1. A dump car comprising a frame, supporting wheels mounted on the frame, a body, means for emptying the body mounted thereon, said means requiring more operating power for actuation than is required to pull the car on its wheels, means actuatable by a straight line pull for operating the emptying means and located beneath the car between the wheels, and means on said last-named means for holding the end of a tow line.

2. In combination with an inclined track, a sheave positioned between the rails at a distance from the top of the track such that when the car is at the top of the track the sheave will be beneath the car and between its wheels, a dump car comprising a frame, supporting wheels mounted on the frame, a body on the car, means for emptying the body mounted thereon, said means requiring more power than is required to pull the car up the incline, means for actuating the emptying means located beneath the car between its wheels, and a hoist cable extending over the sheave and operably connected to the actuating means, whereby when the car is drawn over the sheave, it ceases to move up the track and the hoist cable functions the emptying means instead.

3. In combination with an inclined track, a sheave positioned between the rails at a distance from the top of the track such that when the car is at the top of the track the sheave will be beneath the car and between its wheels, a dump car comprising a frame, supporting wheels mounted on the frame, a body pivotally mounted on the frame so that it may be tilted for emptying purposes, a drum rotatably mounted beneath the frame and between the wheels, a linkage actuatably connecting the drum to the body for tilting the latter, the force required to turn the drum being greater than that required to move the car loaded, and a hoist cable having one end around and fastened to the drum, and belayed over the sheave.

4. In combination with an inclined track having a sheave adjacent a rail near the top thereof, a dump car comprising a frame, supporting wheels mounted on the frame, a shaft mounted on the frame, a large diameter drum and a smaller diameter drum both keyed to said shaft, actuatable means for tilting the body, a cable fastened to the small drum and to the actuatable means, the force required to turn the drum being greater than that required to move the car loaded, and a hoist cable connected to the large drum and extending over the sheave, whereby when the car is drawn over the sheave, the hoist cable commences to rotate the drum thereby reeling in the cable connected to the actuatable means.

5. In combination with an inclined track having a sheave near the top thereof, a dump car comprising a frame, supporting wheels mounted on the frame, a body mounted on a pivot on the frame which is parallel to the normal position of the supporting wheel shafts, an arm for raising the body, a rotatable shaft mounted on the frame, a drum keyed to the shaft, a cable around the shaft and connected to the free end of the arm, the force required to turn the drum being greater than that required to move the car loaded, and a hoist cable around the drum and extending over the sheave whereby, when the car is drawn over the sheave, the hoist cable commences to rotate the drum thereby reeling in the cable connected to the actuatable means.

6. In combination with an inclined track, a dump car, a counterweight lighter than the dump car and connected thereto by a cable, emptying means actuatable from beneath the car, said emptying means requiring more power than is required to pull the car loaded up the track, a sheave positioned between the rails at a distance from the top of the track such that when the car is at the top of the track the sheave will be beneath the car and between its wheels, and a hoist cable extending over the sheave and operably connected to the emptying means beneath the car.

7. In combination with an inclined track supporting a car having emptying means actuatable from beneath the car and counterbalanced by a cable against a weight approximating that of the car, said emptying means requiring more power to function than is required to draw the counterbalanced car loaded up the track, a source of power connected through a clutch to a winch, a sheave positioned between the rails at a distance from the top of the track such that when the car is at the top of the track the sheave will be beneath the car and between its wheels, and a hoist cable having one end reelable on the winch and the other end over the sheave and connected to the emptying means beneath the dump car.

8. The combination of claim 7 together with a brake on the winch for holding the emptying means in operable position for a short period of time after the clutch has been disengaged.

9. A dump car comprising a frame, supporting wheels mounted on the frame, a body pivotally mounted on the frame, means for tilting the body around the pivot so as to empty it, said means requiring more operating power than is required to pull the car loaded on its wheels, means for actuating the tilting means located beneath the car and means for operably connecting a tow line to said actuating means.

10. A dump car comprising a frame, supporting wheels mounted on the frame, a body, means for emptying the body mounted thereon, a rotatable drum mounted beneath the frame, a linkage responsive to rotation of the drum for functioning the emptying means, the power required to operate the linkage exceeding that required to pull the car on its wheels, and means for holding one end of a tow line to said drum.

11. A dump car comprising a frame, supporting wheels mounted on the frame, a body pivotally mounted on the frame, means for tilting the body around the pivot, a shaft mounted on the frame, a pair of drums keyed to the shaft, the relationship in the size of the drums being such that the resistance offered by the cable connected to the emptying means to rotation of the shaft is greater than the resistance offered by the dump car loaded to movement on its wheels, a cable having one end connected to one drum and the other end connected to the means for tilting the body, and means for holding one end of a tow line to the other drum.

12. A kangaroo dump car comprising a horizontal bed with wheels lying in a plane inclined with respect to the bed, a body mounted on a pivot on the frame near the upper pair of wheels, means for tilting the body around the pivot, said means requiring more operating power than is required to pull the car loaded up an inclined track which is at an angle that supports the bed in a horizontal position, means for actuating the tilting means located beneath the car and between the wheels and means for operably connecting a tow line to said actuating means.

13. A kangaroo dump car comprising a horizontal bed with wheels lying in a plane inclined with respect to the bed, a body pivotally mounted adjacent one end of the bed of the car, an arm mounted on a pivot on the underside of the body, a rotatable shaft mounted on the frame, a cable having one end connected to the shaft so that it may be reeled upon the shaft and having its other end connected to the arm so as to cause the arm to raise the body, a drum keyed to the shaft, and means for operably connecting a tow line to said drum, the resistance offered by the body-emptying lever train exceeding that offered by the car when loaded to movement on its wheels.

14. A kangaroo dump car comprising a horizontal bed with wheels lying in a plane inclined with respect to the bed, a body pivotally mounted adjacent one end of the bed of the car, an arm mounted on a pivot on the under side of the body, a shaft mounted on the other end of the arm, guideways supporting the ends of the shaft mounted on the frame, a second shaft rotatably mounted on the frame, a cable reelable on said second shaft and coupled in pulling relationship with the second shaft, a drum on said second shaft, and means for connecting a tow line to said drum, the resistance offered by the body-emptying lever train exceeding that offered by the car when loaded to movement on its wheels.

15. A dump car comprising a frame, supporting wheels mounted on the frame, a body pivotally mounted on the frame, that side of the body parallel to the pivot axis being open, means for tilting the body around the pivot, said means requiring more operating power than is required to move the car when loaded on its wheels, means for operably connecting a tow line to said tilting means, a gate over the end of the body and pivotally supported thereon, means responsive to the actuation of the tilting means for raising the gate, means for actuating the tilting means located beneath the car and means for connecting a hoist cable to said actuating means.

JOHN J. BRODESKE.

References Cited in the file of this patent

UNITED STATES PATENTS

| Number | Name | Date |
|---|---|---|
| 360,260 | Warttinger | Mar. 29, 1887 |
| 383,584 | Meyers | May 29, 1888 |
| 652,069 | Achee | June 19, 1900 |
| 1,105,131 | Gledhill | July 28, 1914 |
| 1,321,826 | Humphrey | Nov. 18, 1919 |
| 1,504,034 | Erwin | Aug. 5, 1924 |
| 1,601,241 | Duchscher | Sept. 28, 1926 |
| 1,712,495 | Farrell | May 14, 1929 |
| 2,291,387 | Hale | July 28, 1942 |
| 2,298,200 | Court | Oct. 6, 1942 |
| 2,353,487 | Moss | July 11, 1944 |
| 2,386,410 | Taggart | Oct. 9, 1945 |
| 2,409,752 | Goodwin | Oct. 22, 1946 |
| 2,420,848 | Trinaistich | May 20, 1947 |
| 2,442,571 | Ruddock | June 1, 1948 |

FOREIGN PATENTS

| Number | Country | Date |
|---|---|---|
| 10,504 | Great Britain | July 28, 1887 |
| 405,443 | Great Britain | Feb. 8, 1934 |